United States Patent

Yanagisawa

[11] Patent Number: 5,914,790
[45] Date of Patent: *Jun. 22, 1999

[54] IMAGE READER

[75] Inventor: Taketo Yanagisawa, Hino, Japan

[73] Assignee: Kabushiki Kaisha TEC, Shizuoka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/528,442

[22] Filed: Sep. 14, 1995

[30] Foreign Application Priority Data

Sep. 20, 1994 [JP] Japan .................................. 6-224621

[51] Int. Cl.$^6$ .............................. H04N 1/21; H04N 1/40; H04N 1/04; B65H 5/02
[52] U.S. Cl. ......................... 358/471; 358/296; 358/474; 358/494; 358/496; 358/498; 271/272
[58] Field of Search .................... 358/471, 472, 358/474, 296, 487, 494, 498, 496, 506, 488; 355/228, 229, 233, 235; 271/272

[56] References Cited

U.S. PATENT DOCUMENTS

| | | | |
|---|---|---|---|
| 4,542,414 | 9/1985 | Nagane | 271/272 |
| 4,823,195 | 4/1989 | Ito | 358/296 |
| 5,018,720 | 5/1991 | Whittaker et al. | 271/272 |
| 5,030,993 | 7/1991 | Miyasaka | 355/233 |
| 5,093,734 | 3/1992 | Gerlack | 358/474 |
| 5,216,525 | 6/1993 | Lant | 358/496 |
| 5,379,095 | 1/1995 | Oishi | 355/233 |
| 5,432,622 | 7/1995 | Johnson et al. | 358/474 |
| 5,610,731 | 3/1997 | Itoh | 358/496 |

FOREIGN PATENT DOCUMENTS 4-34055  3/1992  Japan .

*Primary Examiner*—Edward L. Coles
*Assistant Examiner*—Mark E. Wallerson
*Attorney, Agent, or Firm*—Frishauf, Holtz, Goodman, Langer & Chick

[57] ABSTRACT

An image reader includes guide plates for defining an original convey path, a conveying mechanism for conveying an original along the original convey path, an optical reading section for illuminating the original fed by the conveying mechanism and for reading image information on the basis of reflection light from the original, and a mounting member for mounting the conveying mechanism and the optical reading section on the guide plate. In particular, the guide plate has a plurality of openings arranged in a direction of original conveyance, the conveying mechanism has a plurality of rollers protruding into the original convey path through the openings, for rotating to convey the original, and the mounting member has a plurality of supporting portions disposed beside the openings, for rotatably supporting the rollers.

9 Claims, 3 Drawing Sheets

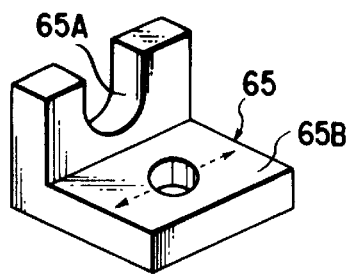
F I G. 5
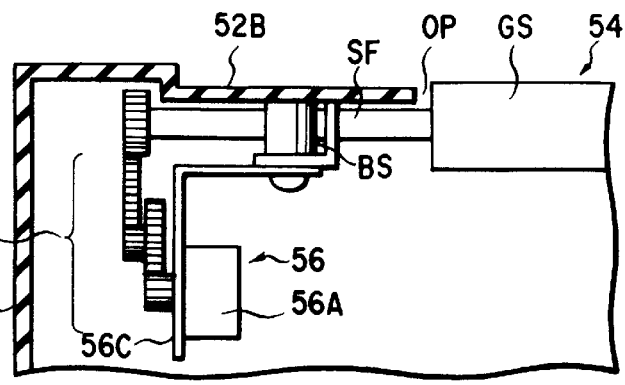
F I G. 6
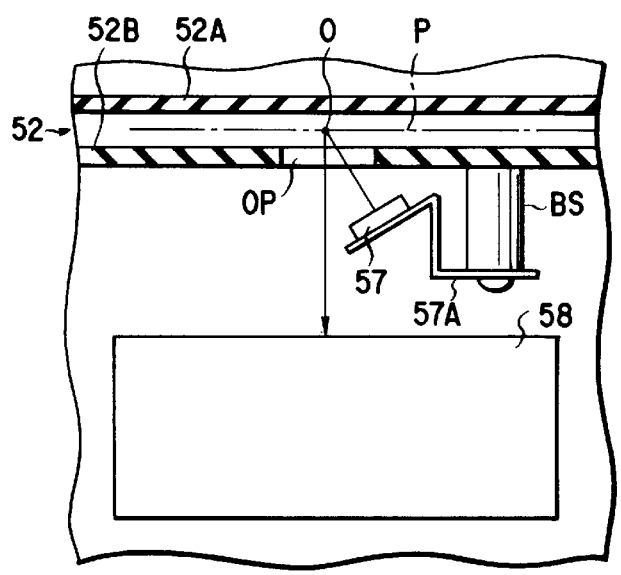
F I G. 7
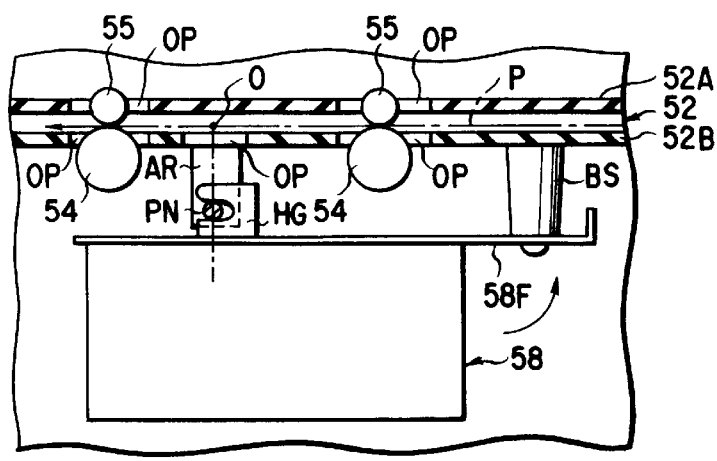
F I G. 8

IMAGE READER

BACKGROUND OF THE INVENTION

1. Field of the Invention

The present invention relates to an image reader which reads image information recorded on an original while moving the original.

2. Description of the Related Art

In a conventional facsimile apparatus, an image reader is constructed such as shown in FIGS. 1 and 2. When a pickup roller 3 and feed rollers 4 are driven by a drive unit 6, an original P is picked up from an original table 1 to an original convey path 2 by the pickup roller 3, and is moved along the original convey path 2 by pairs of a feed roller 4 and a guide roller 5. An illumination light source 7 illuminates an original P passing through a predetermined position on the original convey path 2, and an image detection unit 8 photoelectrically converts a reflection light from the original P illuminated by the illumination light source, thereby to detect image information.

The original convey path 2 described above is defined by a guide plate 21 formed as a bottom surface of an upper housing 13 and a guide plate 22 formed as an upper surface of a lower housing 11. The guide rollers 5 are rotatably mounted on the guide plate 21, while the pickup roller 3 and feed rollers 4 are rotatably mounted on a chassis 14 fixed in the lower housing 11. The drive unit 6, the illumination light source 7, and the image detection unit 8 are mounted on the chassis 14.

Since the pickup roller 3, the feed rollers 4, the drive unit 6, the illumination light source 7, and the image detection unit 8 must be mounted in a layout suitable for reading image information, the shape of the chassis 14 is complicated, and the area occupied by the chassis as well as the weight of the chassis are increased. This not only leads to an increase in the manufacturing cost of a facsimile apparatus, but also limits the layout design of circuit boards arranged in the space surrounding the chassis 14, thus preventing down-sizing and weight reduction of the facsimile apparatus.

Therefore, conventional facsimile apparatuses have not been widely used as household facsimile apparatuses.

SUMMARY OF THE INVENTION

The present invention has an object of providing an image reader which can reduce limitations in the layout design.

This object is achieved by an image reader which comprises a guide member for defining an original convey path, a conveying mechanism for conveying an original along the original convey path, an optical reading section for illuminating the original fed by the conveying mechanism and for reading image information on the basis of reflection light from the original, and a mounting member for mounting the conveying mechanism and the optical reading section on the guide member, wherein the guide member has a plurality of openings arranged in a direction of original conveyance, the conveying mechanism has a plurality of rollers protruding into the original convey path through the openings, for rotating to convey the original, and the mounting member has a plurality of supporting portions disposed beside the openings, for rotatably supporting the rollers.

In the image reader described above, since the conveying mechanism and the optical reading section are mounted on the guide member, a conventional chassis is not necessary for supporting these components. Therefore, the occupation space and the weight of the above-described image reader can be reduced much more than those of an image reader using the conventional chassis. In particular, since the supporting portion are disposed beside the openings, the rollers need not be long. Accordingly, spaces adjacent the ends of the rollers can be utilized effectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 5 is a perspective view showing a bearing for a feed roller shown in FIG. 4;

FIG. 6 is a view showing a drive unit mounted on a second guide plate shown. in FIG. 3;

FIG. 7 is a view showing an illumination light source mounted on the second guide plate shown in FIG. 3; and FIG. 8 is a view showing an image detection unit mounted on the second guide plate shown in FIG. 3.

DETAILED DESCRIPTION OF THE PREFERRED EMBODIMENT

In the following, a facsimile apparatus according to an embodiment of the invention will be explained with reference to the accompanying drawings.

Figure 1:
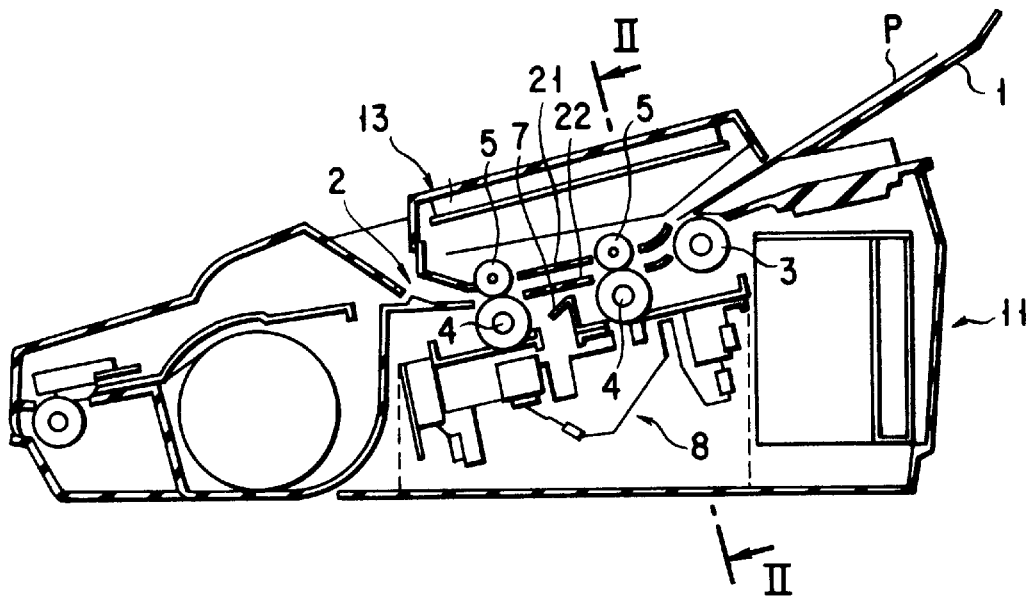
FIG. 1 is a cross-section showing the internal structure of a conventional facsimile apparatus.
Figure 2:
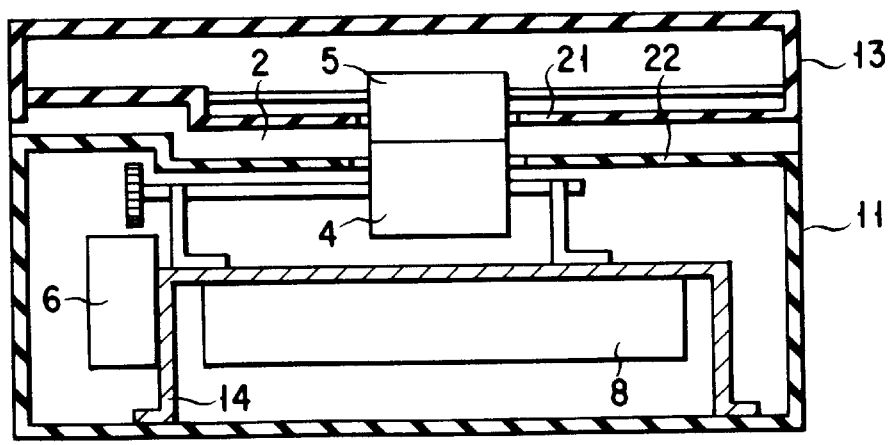
FIG. 2 is a cross-section showing the cross-sectional structure of the facsimile apparatus cut along line II—II of FIG. 1.
Figure 3:
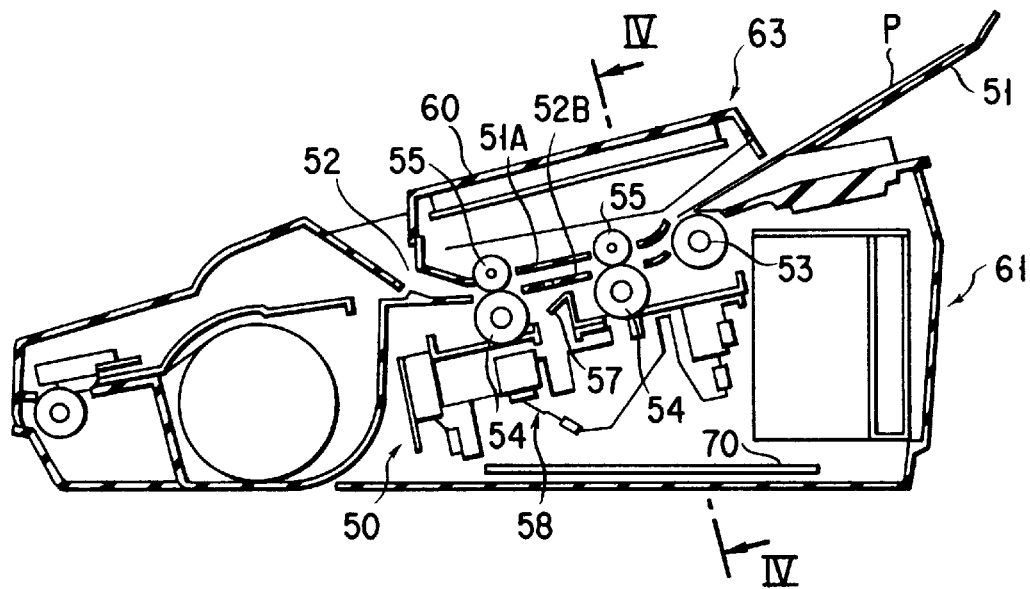
FIG. 3 is a cross-section showing the internal structure of a facsimile apparatus according to an embodiment of the present invention.
Figure 4:
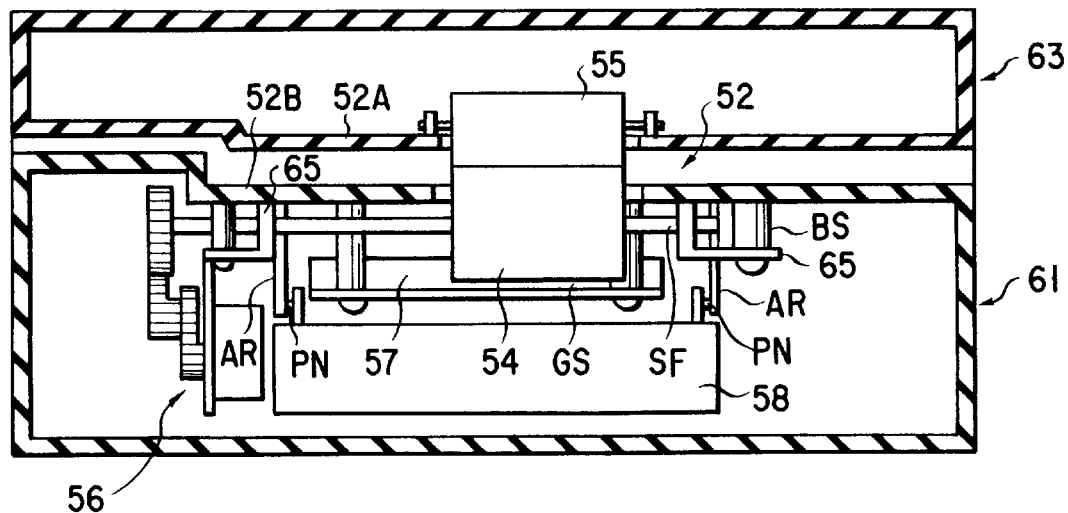
FIG. 4 is a cross-section showing the cross sectional structure of the facsimile apparatus cut along line IV—IV of FIG. 3.

FIG. 3 shows the internal structure of this facsimile apparatus. FIG. 4 shows a cross-section of the facsimile apparatus along the line IV—IV of FIG. 3. This facsimile apparatus includes a lower housing 61, and an upper housing 63 formed to fit on the lower housing 61 and which is openable upward from the lower housing 61. The facsimile apparatus further includes an original table 51 projecting from the lower housing 61, an image reader 50 disposed inside the lower and upper housings 61 and 63, an operation panel 60 exposed in the upper surface of the upper housing 63, and a facsimile circuit board 70 disposed inside the lower housing 61. The operation panel 60 is operated to input various instructions. The original table 51 supports an original P placed thereon The image reader 50 reads image information to be transmitted, from the original P. The facsimile circuit board 70 controls the image reader 50 according to an instruction from the operation panel 60, and transmits the image information read by the image reader 50 to the outside, in the form of facsimile signals, as well as receives facsimile signals from the outside.

The image reader 50 includes a pickup roller 53 for picking up an original P placed on the original table 51, pairs of a feed roller 54 and a guide roller 55 for conveying the original P picked by the pickup roller 53 along the original convey path 52, a drive unit 56 for driving the feed rollers 54, an illumination light source 57 for illuminating the original P passing through a predetermined position on the original convey path 52, and an image detection unit 58 for photoelectrically converting reflection light from the original P illuminated by the illumination light source 57, thereby to detect image information. The pickup roller 53 extends perpendicularly to the convey direction in which the original P is conveyed. Pairs of a feed roller 54 and a guide roller 55 are arranged along the original convey path 52, and extend in parallel with the pickup roller 53. The original convey path 52 is defined by a first guide plate 52A (FIG. 4) formed as a bottom surface of the upper housing 63 and a second guide plate 52B (FIG. 4) formed as an upper surface of the lower housing 61.

Each of the pickup roller 53, feed rollers 54, and guide rollers 55 has a roll portion GS (FIG. 6) having an elastic surface made of e.g., rubber, and a shaft SF projecting from both ends of the roll portion GS. Each of the guide rollers 55 is rotatably supported by a pair of bearings 65 mounted on the first guide plate 52A. Each of the pickup roller 53 and the feed rollers 54 is rotatably supported by a pair of bearings 65 mounted on the second guide plate 52B. More specifically, as shown in FIG. 5, each of the bearings 65 has a receiving portion 65A for receiving the shaft SF and a through-hole 65B for allowing a screw to penetrate, and is screwed to the guide plate 52A or one of bosses BS integral with and projecting from the guide plates 52B. The roll portions GS of the guide rollers 55 protrude through openings OP (FIGS. 7 and 8) formed in the first guide plate 52A into the original convey path 52, while the roll portions GS of the pickup roller 53 and the feed rollers 54 protrude through openings OP formed in the second guide plate 52B into the original convey path 52. Paired rollers 54 and 55 of each pair are set in contact with each other, in order to convey an original P with the original being clamped therebetween.

The drive unit 56 includes a drive motor 56A, a plurality of gears 56B engaged with each other to transmit rotation of the motor 56 to the pickup roller 53 and the feed rollers 54, and a metal plate 56C for supporting the motor 56A and gears 56B, as shown in FIG. 6. This metal plate 56C is screwed to some of the bosses BS projecting from the guide plate 52B.

The illumination light source 57 has a line of LEDs disposed to illuminates an original P crossing a virtual line supposed to be extending perpendicularly to the original convey direction at a predetermined position 0 indicated in FIG. 7. The illumination light source is fixed to a metal base 57A as shown in FIG. 7, and is screwed to two of the bosses BS projecting from the guide plate 52B.

The image detection unit 58 has a solid-state image sensor such as a line CCD or the like, and an optical system such as a lens or the like for focusing reflection light from an original P on the solid-state image sensor. This unit is mounted on a supporting plate 58F which is fixed to a pair of arms AR and one of the bosses BS projecting from the guide plate 52B, as shown in FIG. 4. More specifically, the paired arms AR have a pair of support pins PN projecting in parallel with the virtual line from front ends of the arms AR, and the supporting plate 58F has a pair of hook portions HG (see FIG. 8) which are hooked on the support pins PN. Therefore, the supporting plate 58F is rotated with the pair of hook portions HG being hooked on the support pins PN, and screwed to the boss BS.

In the facsimile apparatus as explained above, the pickup roller 53, feed rollers 54, drive unit 56, illumination light source 57, and image detection unit 58 are mounted on the guide plate 52B serving as part of the original convey path 52. As a result of this, a chassis ordinarily used for supporting those components in a conventional apparatus is not required any more. Therefore, the occupation space and weight of an image reader can be reduced to be smaller than in a convention apparatus using such a chassis. Since down-sizing and weight reduction of a facsimile apparatus can thus be achieved while reducing the manufacturing cost thereof, the facsimile apparatus can be used more easily as a household facsimile apparatus.

Further, since the bearings 65 and bosses BS are disposed beside the openings OP, the rollers 54 need not be long. Accordingly, spaces neighboring the ends of the rollers 54 can be utilized effectively. Further, since the bearing 65 is screwed to the boss BS, the position of the feeding roller 54 is adjustable, for example, by using a spacer to be inserted between the bearing 65 and the boss BS. As for the image detection unit 58, it is simply mounted by screwing the supporting plate 58F to the boss BS after hooking the hooking portions HG on the support pins PN and moving the supporting plate 58F around the support pins PN as indicated by an arrow shown in FIG. 8. Therefore, a positioning error of the image detecting unit 58 does not easily occur.

In the above embodiment, the illumination light source 57 is directly mounted on the guide plate 52. However, it may be indirectly mounted on the guide plate 52B by fixing the light source 57 to the image detection unit 58.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image reader comprising:
   a housing member;
   a guide member for defining an original convey path in said housing member;
   a conveying mechanism for conveying an original along said original convey path;
   an optical reading section for illuminating the original fed by said conveying mechanism and for reading image information on the basis of reflection light from the original; and
   mounting means for mounting said conveying mechanism and said optical reading section on said guide member;

wherein:
said guide member includes a lower guide plate which has a plurality of openings arranged in a direction of original conveyance under said original convey path, said lower guide plate bridging over an entire area between sides of said housing member which are opposed in a direction perpendicular to the original conveyance direction,
said conveying mechanism includes:
a plurality of first rollers protruding into said original convey path through the openings of said lower guide plate, for rotating to convey the original, and
a drive unit for driving said first rollers, and said mounting means includes:
a plurality of first supporting portions projecting downward from said lower guide plate, for rotatably supporting said first rollers, and
a fixing member for fixing said drive unit to said lower guide plate with the fixing member interposed between said drive unit and said lower guide plate to thereby provide a space which is not occupied by said drive unit, at the bottom of said housing member.

2. An image reader according to claim 1, wherein:
said guide member further includes an upper guide plate which has a plurality of openings arranged in the original conveyance direction above said original convey path, said upper guide plate bridging over the entire area between the sides of said housing member,
said conveying mechanism further includes a plurality of second rollers protruding into said original convey path through the openings of said upper guide plate, for rotating along with said first rollers to convey the original, and
said mounting means further includes a plurality of second supporting portions fixed to said upper guide plate, for rotatably supporting said second rollers.

3. An image reader according to claim 1, wherein:
said optical reading section includes:
an illumination light source for illuminating the original passing through a predetermined position, and
an image detecting unit for photoelectrically converting reflection light from the original illuminated by said illumination light source to detect image information; and
said mounting means further includes a fixing member for fixing said image detecting unit to said lower guide plate.

4. An image reader according to claim 1, wherein each first supporting portion includes:
a pair of projections integral with and projecting downward from said lower guide plate, and
a pair of bearings screwed to said projections, for supporting a shaft of respective ones of said first rollers.

5. An image reader according to claim 3, wherein said fixing member includes:
a projection integral with and projecting downward from said lower guide plate,
a pair of arms integral with and projecting from said lower guide plate and having a pair of pins opposed to each other at front ends of the paired arms which are remote from said lower guide plate, and
a supporting plate hooked on said pair of pins and screwed to said projection of said fixing member, for supporting said image detecting unit.

6. A facsimile apparatus comprising:
a housing member;
an image reader for reading image information recorded on an original while moving the original; and
a facsimile circuit board for transmitting the image information read by said image reader in a form of facsimile signals;
said image reader including:
a guide member for defining an original convey path in said housing member;
a conveying mechanism for conveying an original along said original convey path;
an optical reading section for illuminating the original fed by said conveying mechanism and for reading image information based on reflection light from the original; and
mounting means for mounting said conveying mechanism and said optical reading section on said guide member;
wherein:
said guide member includes a lower guide plate which has a plurality of openings arranged in a direction of original conveyance under said original convey path, said lower guide plate bridging over an entire area between sides of said housing member which are opposed in a direction perpendicular to the original conveyance direction,
said conveying mechanism includes:
a plurality of rollers protruding into said original convey path through the openings of said lower guide plate, for rotating to convey the original, and
a drive unit for driving said rollers, and said mounting means includes:
a plurality of supporting portions projecting downward from said lower guide plate, for rotatably supporting said rollers, and
a fixing member for fixing said drive unit to said lower guide plate with the fixing member interposed between said drive unit and said lower guide plate to thereby provide a space which is not occupied by said drive unit, at the bottom of said housing member.

7. An image reader according to claim 1, wherein said first supporting portions are located at positions spaced apart from the sides of said housing member.

8. An image reader according to claim 2, wherein said second supporting portions are located at positions spaced apart from the sides of said housing member.

9. An image reader comprising:
a housing member;
a guide member for defining an original convey path in said housing member;
a conveying mechanism for conveying an original along said original convey path;
an optical reading section for illuminating the original fed by said conveying mechanism and for reading image information on the basis of reflection light from the original; and
mounting means for mounting said conveying mechanism and said optical reading section on said guide member;
wherein:
said guide member includes a lower guide plate which has a plurality of openings arranged in a direction of original conveyance under said original convey path, said lower guide plate bridging over an entire area between sides of said housing member which are opposed in a direction perpendicular to the original conveyance direction, said conveying mechanism includes a plurality of first rollers protruding into said original convey path through the openings of said lower guide plate, for rotating to convey the original, said mounting means includes a plurality of first supporting portions projecting downward from said lower guide plate, for rotatably supporting said first rollers, said optical reading section includes:
  an illumination light source for illuminating the original passing through a predetermined position, and
  an image detecting unit for photoelectrically converting reflection light from the original illuminated by said illumination light source to detect image information; and said mounting means further includes a fixing member for fixing said image detecting unit to said lower guide plate, said fixing member including:
  a projection integral with and projecting downward from said lower guide plate,
  a pair of arms integral with and projecting from said lower guide plate and having a pair of pins opposed to each other at front ends of the paired arms which are remote from said lower guide plate, and
  a supporting plate hooked on said pair of pins and screwed to said projection of said fixing member, for supporting said image detecting unit.

* * * * *